US012300425B2

(12) United States Patent
Someya et al.

(10) Patent No.: US 12,300,425 B2
(45) Date of Patent: May 13, 2025

(54) COIL COMPONENT

(71) Applicant: TDK CORPORATION, Tokyo (JP)

(72) Inventors: Shuhei Someya, Tokyo (JP); Kouyu Ohi, Yamagata (JP); Tasuku Mikogami, Tokyo (JP)

(73) Assignee: TDK CORPORATION, Tokyo (JP)

( * ) Notice: Subject to any disclaimer, the term of this patent is extended or adjusted under 35 U.S.C. 154(b) by 206 days.

(21) Appl. No.: 17/834,721

(22) Filed: Jun. 7, 2022

(65) Prior Publication Data

US 2022/0301766 A1 Sep. 22, 2022

Related U.S. Application Data

(63) Continuation of application No. 16/444,747, filed on Jun. 18, 2019, now Pat. No. 11,424,070.

(30) Foreign Application Priority Data

Jun. 19, 2018 (JP) ................................ 2018-116325
Aug. 22, 2018 (JP) ................................ 2018-155701
Apr. 4, 2019 (JP) ................................ 2019-072023

(51) Int. Cl.
*H01F 27/29* (2006.01)
*H01F 27/24* (2006.01)
*H01F 27/28* (2006.01)
*H01F 27/34* (2006.01)

(52) U.S. Cl.
CPC ............ *H01F 27/34* (2013.01); *H01F 27/24* (2013.01); *H01F 27/2823* (2013.01); *H01F 27/29* (2013.01)

(58) Field of Classification Search
CPC ...... H01F 27/34; H01F 27/24; H01F 27/2823; H01F 27/29; H01F 27/2852; H01F 17/04; H01F 27/292; H01F 3/12; H01F 17/045; H01F 27/306; H01F 2017/0093
See application file for complete search history.

(56) References Cited

U.S. PATENT DOCUMENTS

2005/0174205 A1* 8/2005 Kitagawa ............. H01F 17/045 336/83
2007/0120758 A1* 5/2007 Takahashi ............... H01Q 7/08 343/788
2013/0027173 A1* 1/2013 Ohsawa ............... H01F 27/306 336/220
2014/0253273 A1* 9/2014 Suzuki ............... H01F 27/2852 336/90

(Continued)

*Primary Examiner* — Mang Tin Bik Lian
(74) *Attorney, Agent, or Firm* — YOUNG LAW FIRM, P.C.

(57) ABSTRACT

Disclosed herein is a coil component that includes: a first magnetic core extending in the first direction and around which the wires are wound; a second magnetic core having a first wall surface part covering the first magnetic core from one side in the second direction, a second wall surface part covering the first magnetic core from other side in the second direction, and a third wall surface part covering the first magnetic core from one side in the third direction; first and second terminal electrodes connected respectively to one ends of the wires and arranged in the first direction along the first wall surface part; and third and fourth terminal electrodes connected respectively to other ends of the wires and arranged in the first direction along the second wall surface part.

9 Claims, 17 Drawing Sheets

(56) References Cited

U.S. PATENT DOCUMENTS

| | | | | |
|---|---|---|---|---|
| 2016/0086725 | A1* | 3/2016 | Igarashi | H01F 27/2823 336/83 |
| 2016/0189853 | A1* | 6/2016 | Kitamura | H01F 27/306 29/605 |
| 2016/0247626 | A1* | 8/2016 | Kawarai | H01F 27/2823 |
| 2016/0247627 | A1* | 8/2016 | Baker | H01F 27/2823 |
| 2018/0233282 | A1* | 8/2018 | Tanaka | H01F 27/02 |
| 2018/0294087 | A1* | 10/2018 | Sakai | H01F 27/306 |
| 2018/0308610 | A1* | 10/2018 | Ishida | H01F 27/292 |
| 2019/0304669 | A1* | 10/2019 | Hirama | H01F 41/061 |
| 2021/0287849 | A1* | 9/2021 | Kawaguchi | H02M 3/33569 |

* cited by examiner

COIL COMPONENT

BACKGROUND OF THE INVENTION

Field of the Invention

The present invention relates to a coil component and, more particularly, to a coil component that functions as a noise filter.

Description of Related Art

As a coil component that functions as a noise filter, coil components described in JP 2007-165407 A and JP 2008-10578 A are known.

The coil component described in JP 2007-165407 A includes a plate-like magnetic core around which two wires are wound and an E-type magnetic core bonded to the plate-like magnetic core, wherein the end portion itself of each wire is used as a terminal electrode by removing an insulating coating from the wire end portion.

The coil component described in JP 2008-10578 A includes a drum-shaped magnetic core having a winding core part around which two wires are wound and a pair of first and second flange parts and a C-type magnetic core covering the winding core part from three directions, wherein one ends of the two wires are connected to two terminal electrodes provided on the first flange part, and the other ends thereof are connected to two terminal electrodes provided on the second flange part.

However, in the coil component described in JP 2007-165407 A, the two wires are exposed in most parts thereof, thus making it difficult to ensure high reliability.

Further, in the coil component described in JP 2008-10578 A, the wires wound around the winding core part and a mounting substrate directly face each other, causing a problem of reliability reduction at this portion. In addition, the two terminal electrodes provided on the first flange part are used as input side electrodes, and the two terminal electrodes provided on the second flange part are used as output side electrodes, so that it is necessary to mount the coil component such that the extending direction of signal wires and the coil axis direction coincide with each other.

On the other hand, a coil component described in JP 2010-10354 A has a configuration in which a plate-like magnetic core is disposed below a drum-shaped magnetic core, so that the wires wound around the winding core part and the mounting substrate do not face each other.

However, in the coil component described in JP 2010-10354 A, a plurality of openings are formed in the flange part of the drum-shaped magnetic core, and the wires are made to pass through the openings for connection to the terminal electrodes. The openings formed in the flange part of the magnetic core area each widened in a direction perpendicular to a magnetic flux flowing direction, so that many magnetic fluxes are divided to increase magnetic resistance, with the result that inductance reduces.

SUMMARY

It is therefore an object of the present invention to provide a coil component capable of being mounted such that wires wound around the winding core part and the mounting substrate do not directly face each other and capable of obtaining high inductance.

A coil component according to the present invention includes: a first magnetic core having a winding core part whose axis direction is a first direction, a first flange part provided at one end of the winding core part in the first direction, and a second flange part provided at the other end of the winding core part in the first direction; a second magnetic core having a first wall surface part covering the first magnetic core from one side in a second direction perpendicular to the first direction, a second wall surface part covering the first magnetic core from the other side in the second direction, and a third wall surface part covering the first magnetic core from one side in a third direction perpendicular to the first and second directions; first and second wires wound around the winding core part of the first magnetic core; first and second terminal electrodes connected respectively to one ends of the first and second wires and arranged in the first direction along the first wall surface part of the second magnetic core as viewed in the third direction; and third and fourth terminal electrodes connected respectively to the other ends of the first and second wires and arranged in the first direction along the second wall surface part of the second magnetic core as viewed in the third direction.

According to the present invention, by mounting the coil component on a mounting substrate such that the third wall surface part of the second magnetic core is interposed between the mounting substrate and the winding core part, reliability can be enhanced. In addition, one ends of the two wires are arranged in the first direction along the first wall surface part, and the other ends thereof are arranged in the first direction along the second wall surface part, thereby eliminating the need to form an opening in the flange parts of the first magnetic core, whereby high inductance can be obtained.

In the present invention, the first to fourth terminal electrodes may be provided so as to cover the third wall surface part of the second magnetic core. This allows the third wall surface part of the second magnetic core to be interposed between the mounting substrate and the winding core part when the coil component is mounted on the mounting substrate.

The coil component according to the present invention may further include a plate-like member covering the first magnetic core from the other side in the third direction. With this configuration, the winding core part is covered from four directions, thereby further enhancing reliability. Further, in a mounting process, the plate-like member can be adsorbed using a picking tool, facilitating handling of the coil component.

The plate-like member may constitute a third magnetic core. This further increases the inductance of the coil component. In this case, the first and second flange parts of the first magnetic core and the third magnetic core may be bonded through an adhesive containing a magnetic material. This reduces the magnetic resistance, making it possible to further increase the inductance of the coil component. Alternatively, the plate-like member may be made of a non-magnetic material. In this case, the plate-like member can be made smaller in thickness, allowing a further reduction in the height of the coil component.

In the present invention, the first to fourth terminal electrodes may be provided so as to cover the plate-like member. This allows the plate-like member to be interposed between the mounting substrate on which the coil component is mounted and the winding core part.

In the present invention, the winding core part of the first magnetic core may have a first winding area positioned at the first flange part side as viewed from the center in the first direction and a second winding area positioned at the second flange part side as viewed from the center in the first direction, and the first and second wires may be wound around the first and second winding areas, respectively. This can make the lengths of the first and second wires coincide to each other more correctly.

In the present invention, the winding core part of the first magnetic core may have a protrusion part provided at a position overlapping the center in the first direction. This allows the coupling degree between the first and second wires in a differential mode to be adjusted by the height of the protrusion part.

In the present invention, the first and second flange parts of the first magnetic core and at least one of the first to third wall surface parts of the second magnetic core may be bonded together through an adhesive containing a magnetic material. This reduces the magnetic resistance, making it possible to further increase the inductance of the coil component.

In the present invention, the first and second wires may each be a flat-type wire, and the first to fourth terminal electrodes may be constituted by the end portions of the first and second wires bent from the third direction to the second direction. This eliminates the need to separately provide the terminal electrode.

As described above, according to the present invention, there can be provided a coil component capable of being mounted such that the wires wound around the winding core part and the mounting substrate do not directly face each other and capable of obtaining a high inductance.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
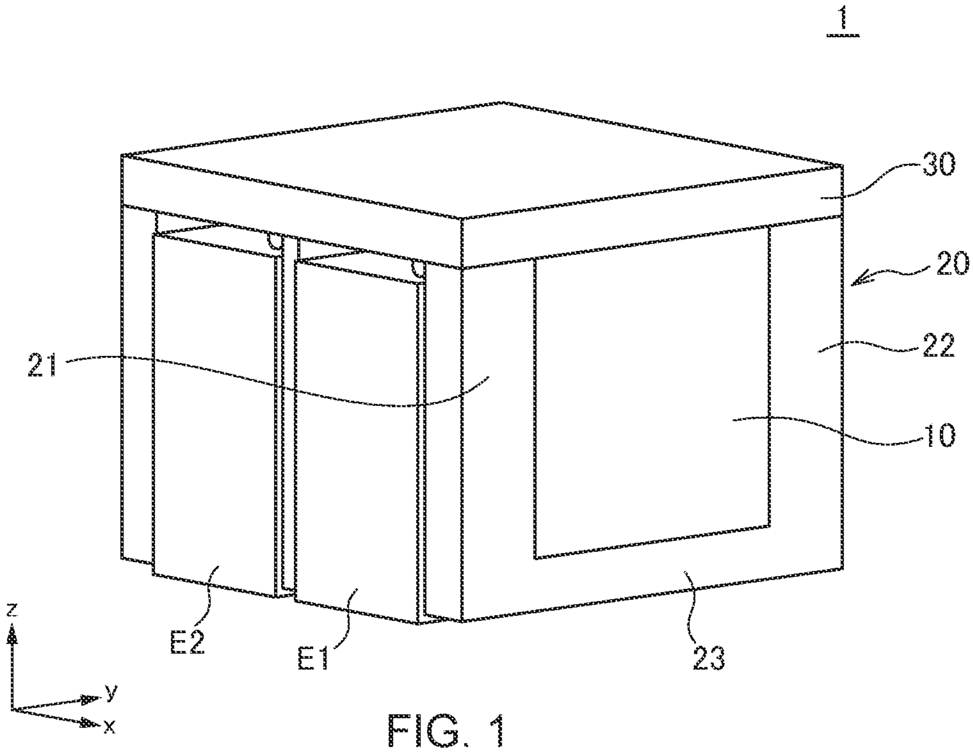
FIG. 1 is a schematic perspective view illustrating the outer appearance of a coil component according to a first embodiment of the present invention.
Figure 2:
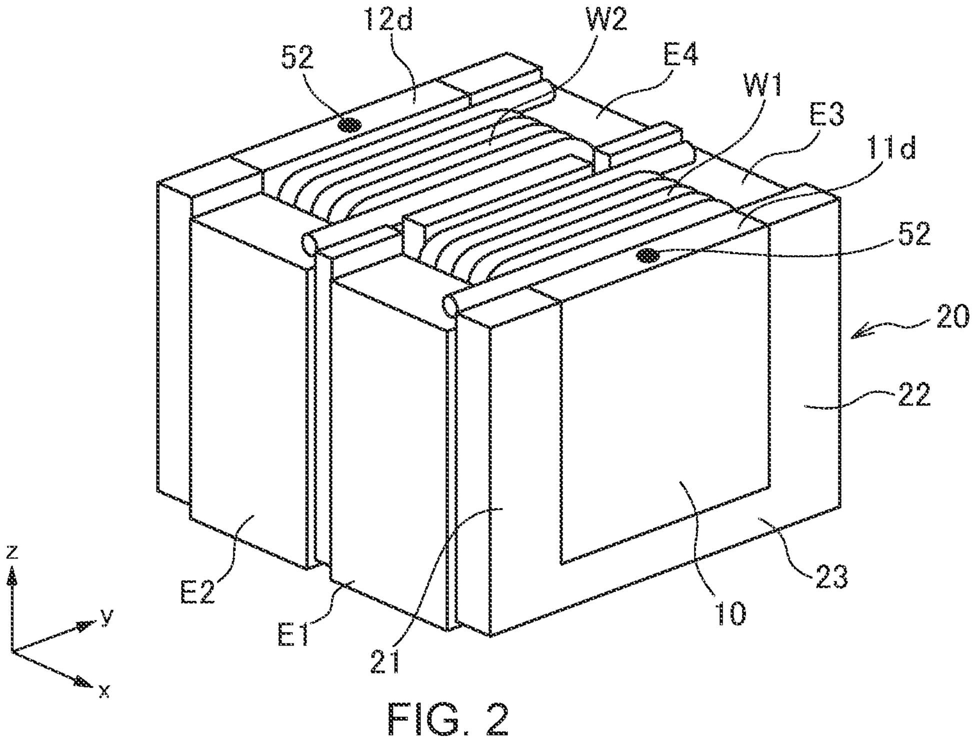
FIG. 2 is a schematic perspective view illustrating a state where a plate-like magnetic core is removed from the coil component according to the first embodiment of the present invention.

FIG. 1 is a schematic perspective view illustrating the outer appearance of a coil component 1 according to the first embodiment of the present invention. FIG. 2 is a schematic perspective view illustrating a state where a plate-like magnetic core 30 is removed from the coil component 1, and FIG. 3 is a schematic exploded perspective view of the coil component 1.

Figure 3:
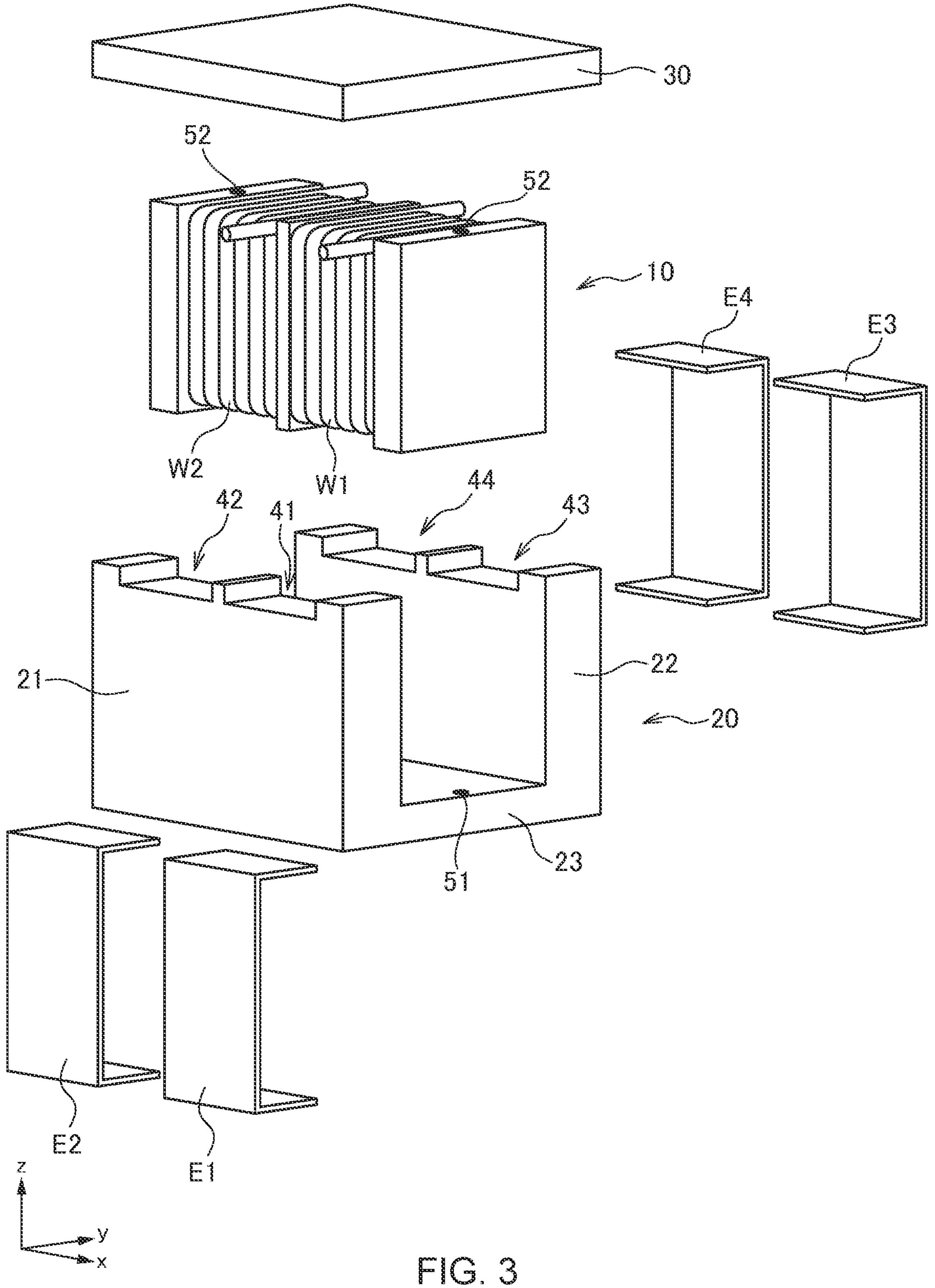
FIG. 3 is a schematic exploded perspective view of the coil component according to the first embodiment of the present invention.

The coil component 1 according to the present embodiment is a coil component suitably used as a common mode filter for power supply or a coupling inductor and includes, as illustrated in FIGS. 1 to 3, a drum-shaped first magnetic core 10, a C-shaped second magnetic core 20 covering the first magnetic core 10 from three directions, a plate-like third magnetic core 30 covering the first magnetic core 10 from one direction, and a pair of wires W1 and W2.

The drum-shaped first magnetic core 10 is wound with the pair of wires W1 and W2 such that the coil axis direction is the x-direction. One ends of the wires W1 and W2 are connected to terminal electrodes E1 and E2, respectively, and the other ends thereof are connected to terminal electrodes E3 and E4. The C-shaped second magnetic core 20 is a member that covers the first magnetic core 10 from both sides in the y-direction and one side in the z-direction. The third magnetic core 30 is a plate-like member that covers the first magnetic core 10 from the other side in the z-direction. As a result, the first magnetic core 10 is completely covered from four directions by the second magnetic core 20 and third magnetic core 30. As the material for the first, second, and third magnetic cores 10, 20, and 30, a magnetic material having high permeability such as ferrite is used.

Figure 4:
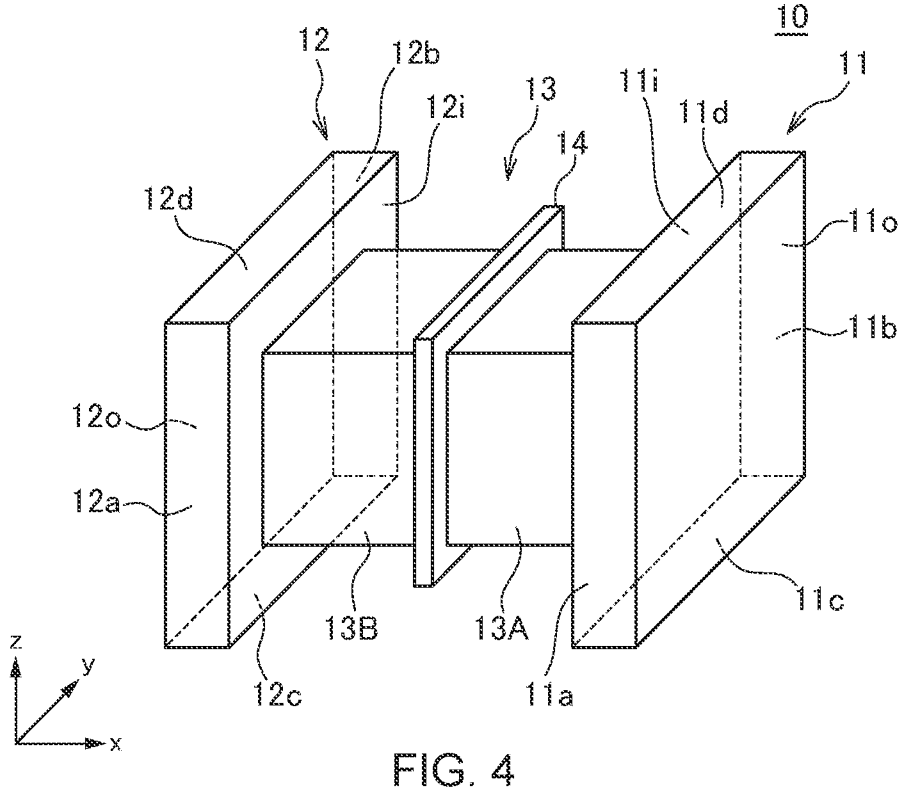
FIG. 4 is a schematic perspective view illustrating the a drum-shaped first magnetic core.

The outer appearance of the drum-shaped first magnetic core 10 is illustrated in FIG. 4. As illustrated, the first magnetic core 10 includes a winding core part 13 whose axis direction is the x-direction, a first flange part 11 provided at one end of the winding core part 13 in the x-direction, and a second flange part 12 provided at the other end of the winding core part 13 in the x-direction. A flange-like protrusion part 14 is provided at the center of the winding core part 13 in the x-direction, and the winding core part 13 is divided, at the protrusion part 14 as a boundary, into a first winding area 13A positioned at the first flange part 11 side and a second winding area 13B positioned at the second flange part 12 side. The first wire W1 is wound around the first winding area 13A and the second wire W2 is wound around the second winding area 13B.

The first flange part 11 has an inner surface 11*i* connected to the winding core part 13, an outer surface 110 positioned at the side opposite to the inner surface 11*i*, and four side surfaces 11*a* to 11*d*. The inner surface 11*i* and outer surface 110 constitute the yz plane, the side surfaces 11*a* and 11*b* constitute the xz plane, and the side surfaces 11*c* and 11*d* constitute the xy plane. Similarly, the second flange part 12 has an inner surface 12*i* connected to the winding core part 13, an outer surface 12*o* positioned at the side opposite to the inner surface 12*i*, and four side surfaces 12*a* to 12*d*. The inner surface 12*i* and the outer surface 12*o* constitute the yz plane, the side surfaces 12*a* and 12*b* constitute the xz plane, and the side surfaces 12*c* and 12*d* constitute the xy plane.

The second magnetic core 20 has a first wall surface part 21 covering the first magnetic core 10 from one side in the y-direction, a second wall surface part 22 covering the first magnetic core 10 from the other side in the y-direction, and a third wall surface part 23 covering the first magnetic core 10 from one side in the z-direction. Although the second magnetic core 20 is desirably a single magnetic member obtained by integrally forming the first to third wall surface parts 21 to 23, it may be constituted of two or more parts bonded to each other.

When the first magnetic core 10 is housed in the second magnetic core 20, the side surface 11*a* of the first flange part 11 and the side surface 12*a* of the second flange part 12 face the first wall surface part 21, the side surface 11*b* of the first flange part 11 and the side surface 12*b* of the second flange part 12 face the second wall surface part 22, and the side surface 11*c* of the first flange part 11 and the side surface 12*c* of the second flange part 12 face the third wall surface part 23. An adhesive is applied at least partially on the facing portions, and the first and second magnetic cores 10 and 20 are fixedly bonded to each other by the adhesive. In the example of FIG. 3, an adhesive 51 is applied on the inner surface of the third wall surface part 23, and the first flange part 11 and the third wall surface part 23 are bonded to each other through the adhesive 51. Further, using an adhesive containing a magnetic material can reduce a magnetic resistance between the first and second magnetic cores 10 and 20, whereby the inductance of the coil component 1 can be increased.

Shallow cuts 41 and 42 are formed in the upper end of the first wall surface part 21, and a part of the terminal electrode E1 and a part of the terminal electrode E2 are disposed in the cuts 41 and 42, respectively. One ends of the wires W1 and W2 are connected respectively to the part of the terminal electrode E1 that is disposed in the cut 41 and to the part of the terminal electrode E2 that is disposed in the cut 42. Similarly, shallow cuts 43 and 44 are formed in the upper end of the second wall surface part 22, and a part of the terminal electrode E3 and a part of the terminal electrode E4 are disposed in the cuts 43 and 44, respectively. The other ends of the wires W1 and W2 are connected respectively to the part of the terminal electrode E3 that is disposed in the cut 43 and to the part of the terminal electrode E4 that is disposed in the cut 44.

The terminal electrodes E1 and E2 respectively have parts disposed in the respective cuts 41 and 42, parts disposed on the outer surface of the first wall surface part 21, and parts disposed on the outer surface of the third wall surface part 23 and arranged in the x-direction along the first wall surface part 21. Similarly, the terminal electrodes E3 and E4 respectively have parts disposed in the respective cuts 43 and 44, parts disposed on the outer surface of the second wall surface part 22, and parts disposed on the outer surface of the third wall surface part 23 and arranged in the x-direction along the second wall surface part 22. The terminal electrodes E1 to E4 may each be a terminal fitting bonded to the second magnetic core 20 or a conductive paste baked onto the surface of the second magnetic core 20.

The third magnetic core 30 is a plate-like member whose main surface is the xy plane and disposed so as to face the side surface 11*d* of the first flange part 11, the side surface 12*d* of the second flange part 12, the upper end surface of the first wall surface part 21, and the upper end surface of the second wall surface part 22. An adhesive is provided at least partially on the facing portions, and the third magnetic core 30 and the first or second magnetic core 10 or 20 are fixedly bonded to each other by the adhesive. In the example of FIGS. 2 and 3, an adhesive 52 is applied on the side surfaces 11*d* and 12*d* of the first and second flange parts 11 and 12, and the first and second flange parts 11, 12 and the third magnetic core 30 are bonded to each other through the adhesive 52. Further, using an adhesive containing a magnetic material can reduce a magnetic resistance between the first magnetic core 10 and the third magnetic core 30, whereby the inductance of the coil component 1 can be increased.

Figure 5:
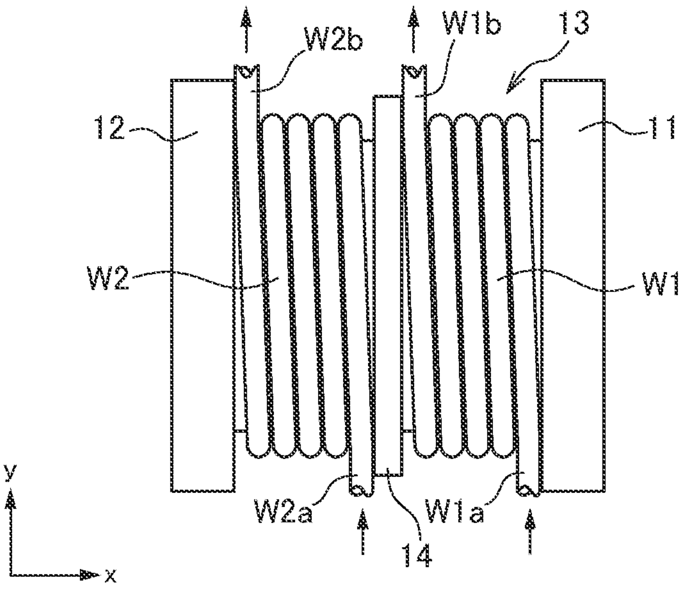
FIG. 5 is a schematic diagram for explaining an example of the winding pattern of the wires.

FIG. 5 is a schematic diagram for explaining an example of the winding pattern of the wires W1 and W2.

In the example of FIG. 5, the winding direction of the wire W1 from one end W1*a* of the wire W1 to the other end W1*b* and the winding direction of the wire W2 from one end W2*a* of the wire W2 to the other end W2*b* are the same and, accordingly, the direction of magnetic flux generated when current is made to flow from the one end W1*a* of the wire W1 to the other end W1*b* and the direction of magnetic flux generated when current is made to flow from the one end W2*a* of the wire W2 to the other end W2*b* are the same. The one end W1*a* and the other end W1*b* of the wire W1 are connected respectively to the terminal electrodes E1 and E3, and one end W2*a* and the other end W2*b* of the wire W2 are connected respectively to the terminal electrodes E2 and E4. With this configuration, the coil component 1 according to the present embodiment functions as a common mode filter in which the terminal electrodes E1 and E2 are used as a pair of input side terminals and the terminal electrodes E3 and E4 are used as a pair of output side terminals.

Figure 6:
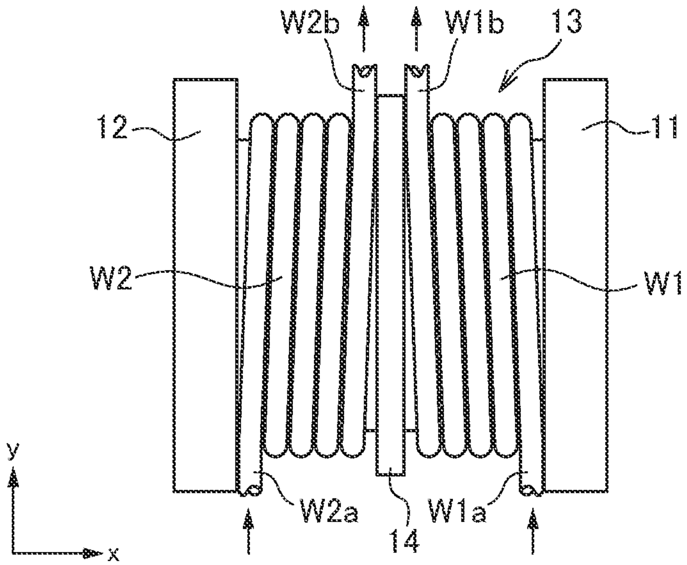
FIG. 6 is a schematic diagram for explaining another example of the winding pattern of the wires.

Further, in the example illustrated in FIG. 5, although the one end W1*a* of the wire W1 is positioned at the first flange part 11 side, the other end W2*b* of the wire W2 is positioned at the second flange part 12 side, and the other end W1*b* of the wire W1 and the one end W2*a* of the wire W2 are both positioned at the protrusion part 14 side, the winding pattern of the wires W1 and W2 is not limited to this. For example, as illustrated in FIG. 6, the wires W1 and W2 may be wound such that the one ends W1*a* and W2*a* thereof are positioned at the first flange part 11 side and second flange part side 12, respectively, and the other ends W1*b* and W2*b* thereof are both positioned at the protrusion part 14 side. That is, any winding pattern can be adopted as long as the direction of magnetic flux generated when current is made to flow from the one end W1*a* of the wire W1 to the other end W1*b* and the direction of magnetic flux generated when current is made to flow from the one end W2*a* of the wire W2 to the other end W2*b* are the same. For example, the wires W1 and W2 may be bifilar-wound, not wound around the winding areas 13A and 13B, respectively. Further, the wires W1 and W2 may be wound in an overlapping manner such that the wires W1 and W2 constitute first and second layers, respectively. When the wires W1 and W2 are bifilar-wound, a space may be provided between adjacent wires.

The pattern shapes of the wires W1 and W2 are the same in the winding pattern illustrated in FIG. 5 and the pattern shapes of the wires W1 and W2 are symmetrical in the winding pattern illustrated in FIG. 6. As a result, in both the winding patterns, a characteristic difference hardly occurs between the wires W1 and W2, so that even when the mounting direction with respect to the mounting substrate is rotated by 180° about the z-axis, characteristics are not changed. That is, a coil component free from directionality can be provided.

Figure 7:
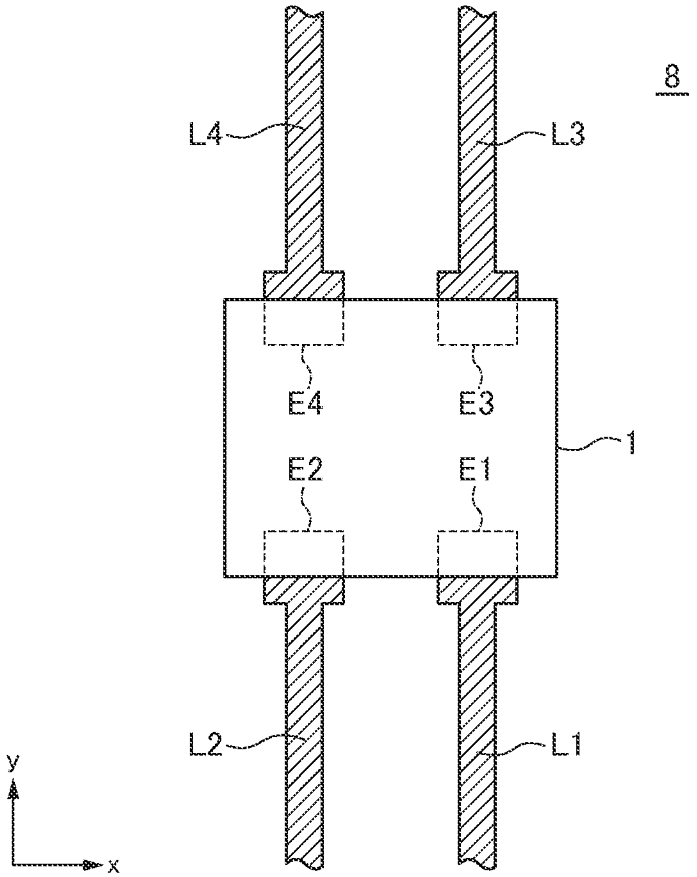
FIG. 7 is a schematic plan view illustrating a state where the coil component according to the first embodiment of the present invention is mounted on a mounting substrate.

FIG. 7 is a schematic plan view illustrating a state where the coil component 1 according to the present embodiment is mounted on a mounting substrate 8.

As illustrated in FIG. 7, a pair of power supply lines L1, L2 and a pair of power supply lines L3, L4 are formed on the mounting substrate 8. One of the pair of power supply lines L1 and L2 (or L3 and L4) is applied with a reference potential (e.g., a ground potential), and the other one thereof is applied with a power supply potential. The coil component 1 according to the present embodiment is mounted on the mounting substrate 8 such that the terminal electrodes E1 to E4 are connected respectively to the power supply lines L1 to L4. With this configuration, load currents in mutually opposite directions flow between the terminal electrodes E1 and E3 and between the terminal electrodes E2 and E4. As a result, common mode noise superimposed on, e.g., the pair of power supply lines L1 and L2 is removed by the coil component 1, and power supply voltage from which the common mode noise is removed is output from the pair of power supply lines L3 and L4. As is clear from FIG. 7, in the coil component 1 according to the present embodiment, the coil axis (x-direction) is perpendicular to the extending direction (y-direction) of the power supply lines L1 to L4.

Figure 8:
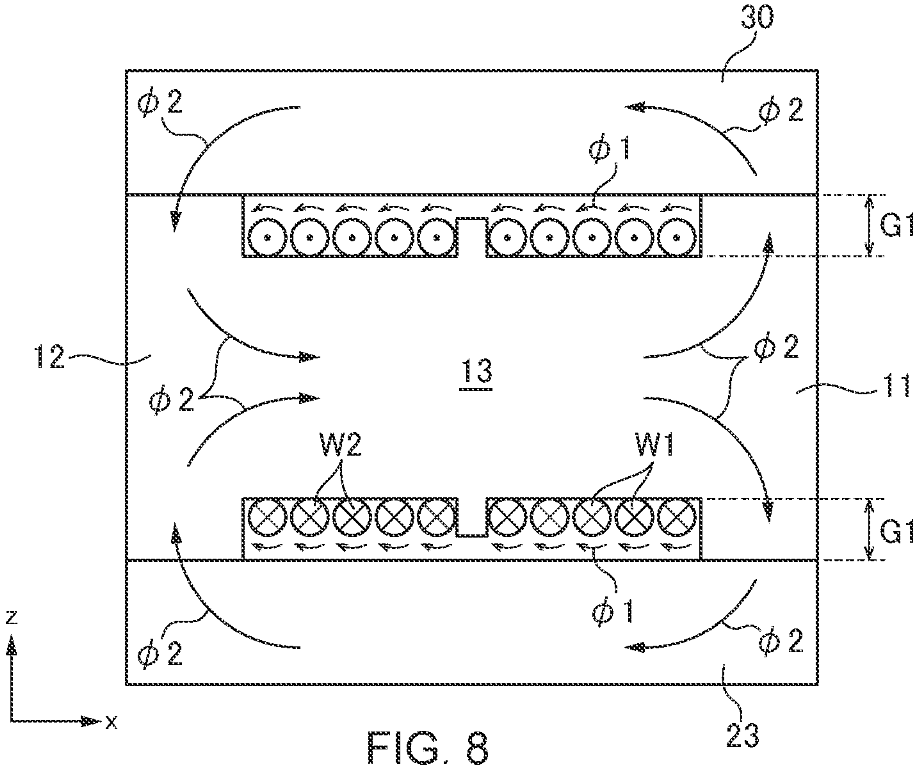
FIG. 8 is a schematic xz cross section of the coil component for explaining the flow of magnetic flux generated when common mode noise is applied to the wires.
Figure 9:
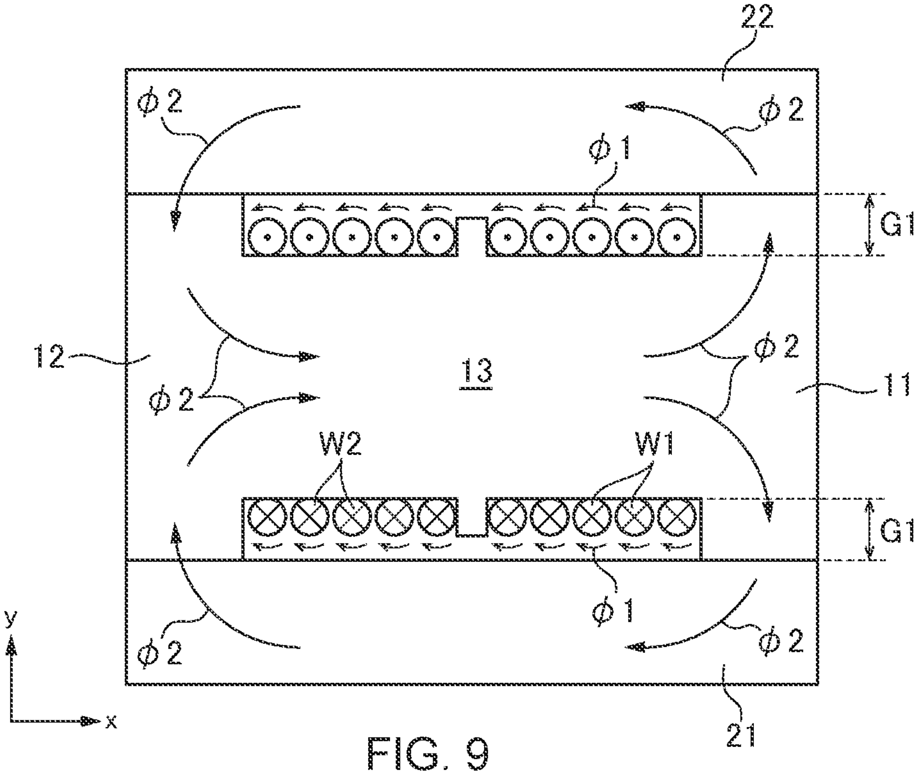
FIG. 9 is a schematic xy cross section of the coil component for explaining the flow of magnetic flux generated when common mode noise is applied to the wires.

FIGS. 8 and 9 are each a schematic view for explaining the flow of magnetic flux generated when common mode noise is applied to the wires W1 and W2. FIG. 8 illustrates the xz cross section of the coil component 1, and FIG. 9 illustrates the xy cross section of the coil component 1.

As illustrated in FIGS. 8 and 9, when common mode noise is applied to the wires W1 and W2, magnetic flux $\phi$1 is generated from each part of the wires W1 and W2 according to the right-handed screw rule. This causes magnetic flux $\phi$2 to flow in a closed magnetic path formed by the first magnetic core 10, second magnetic core 20, and third magnetic core 30. Since the wires W1 and W2 are wound in the same direction, the magnetic flux $\phi$2 generated by the wire W1 and the magnetic flux $\phi$2 generated by the wire W2 strengthen each other. As a result, there can be obtained high impedance with respect to the common mode component of current flowing in the wires W1 and W2.

The magnetic flux $\phi$1 generated from each part of the wires W1 and W2 flows mainly in the winding core part 13 of the first magnetic core 10; however, when a gap G1 between the winding core part 13 and the second magnetic core 20 or third magnetic core 30 is narrow, a part of the magnetic flux $\phi$1 flows also in the second magnetic core 20 or third magnetic core 30 to thereby strengthen the magnetic flux $\phi$2 flowing in the closed magnetic flux. Thus, by making the gap G1 narrow, it is possible to further increase the impedance with respect to the common mode component.

Figure 10:
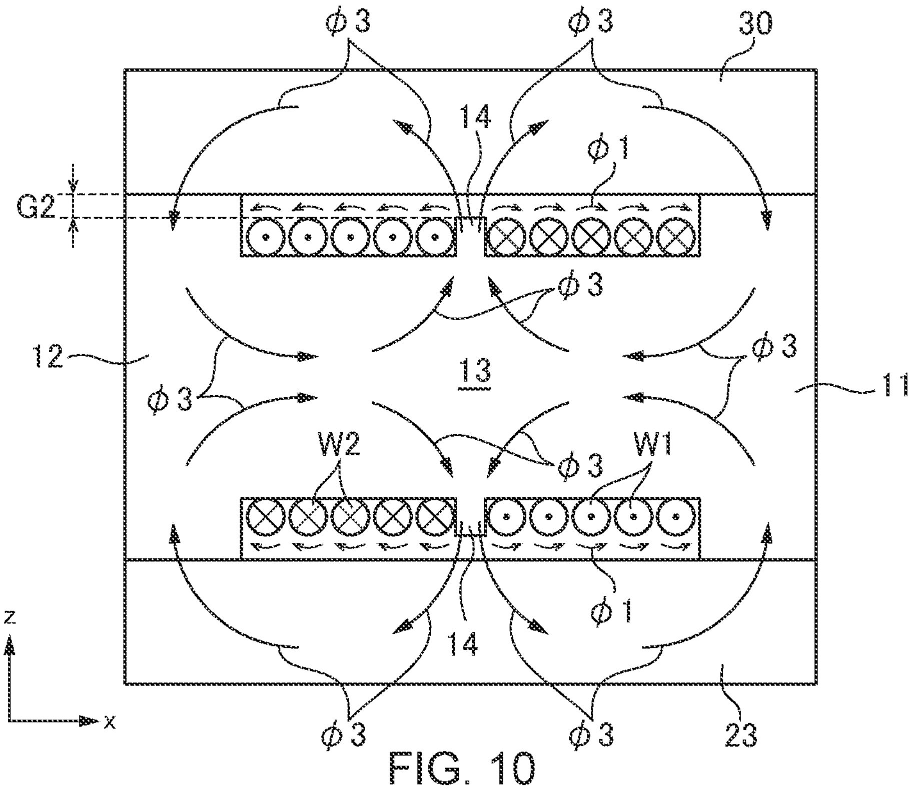
FIG. 10 is a schematic xz cross section of the coil component for explaining the flow of magnetic flux generated when differential mode noise is applied to the wires.
Figure 11:
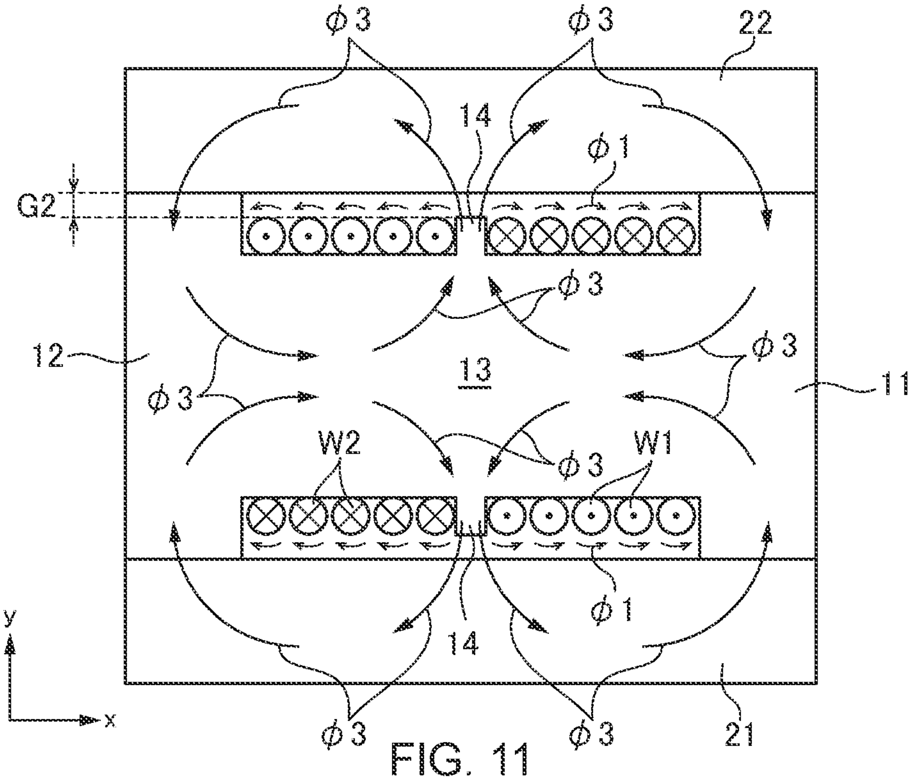
FIG. 11 is a schematic xy cross section of the coil component for explaining the flow of magnetic flux generated when differential mode noise is applied to the wires.

FIGS. 10 and 11 are each a schematic view for explaining the flow of magnetic flux generated when differential mode noise is applied to the wires W1 and W2. FIG. 10 illustrates the xz cross section of the coil component 1, and FIG. 11 illustrates the xy cross section of the coil component 1.

As illustrated in FIGS. 10 and 11, when differential mode noise is applied to the wires W1 and W2, magnetic flux $\phi$1 is generated from each part of the wires W1 and W2 according to the right-handed screw rule. This causes magnetic flux $\phi$3 to flow in a closed magnetic path formed by the first magnetic core 10, second magnetic core 20, and third magnetic core 30. The magnetic flux $\phi$3 passes through the protrusion part 14 provided in the winding core part 13. The magnetic flux $\phi$3 generated by the wire W1 and the magnetic flux $\phi$3 generated by the wire W2 flow in the same direction at the protrusion part 14, so that the magnetic flux $\phi$3 contributes to impedance with respect to the differential mode component of current flowing in the wires W1 and W2. That is, by providing the protrusion part 14 in the winding core part 13, it is possible to remove also the differential mode noise superimposed on the power supply line.

The impedance with respect to the differential mode component can be adjusted by a gap G2 between the protrusion part 14 and the second magnetic core 20 and between the protrusion part 14 and the third magnetic core 30. That is, by changing the height of the protrusion part 14, the impedance with respect to the differential mode component can be adjusted.

Load current flowing in the power supply lines L1 to L4 is also composed of the differential mode component. However, the load current flowing in the power supply lines L1 to L4 is DC current or very low frequency, and the coil component 1 according to the present embodiment has sufficiently low impedance with respect to DC or very low frequency differential mode component, so that the flow of the load current is not impeded by the coil component 1. Further, when the coil component 1 according to the present embodiment is used as a coupling inductor, the load current flowing in the power supply lines L1 to L4 is composed of a common mode component, and the coil component 1 according to the present embodiment has sufficiently low impedance with respect to DC or very low frequency common mode component, so that the flow of the load current is not impeded by the coil component 1.

Figure 12:
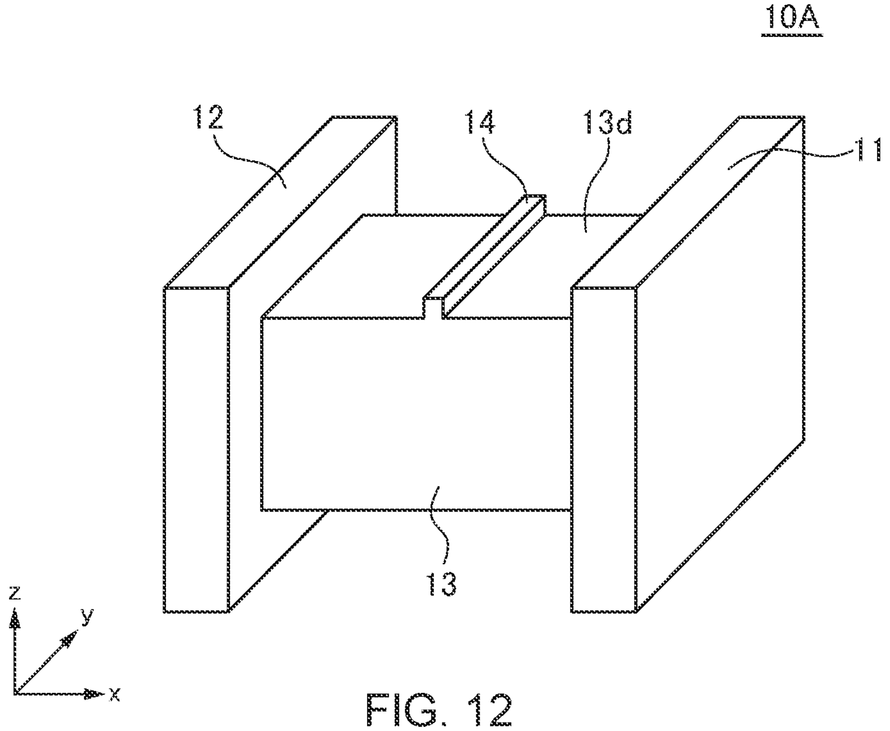
FIG. 12 is a schematic perspective view illustrating the a drum-shaped first magnetic core according to a first modification.
Figure 13:
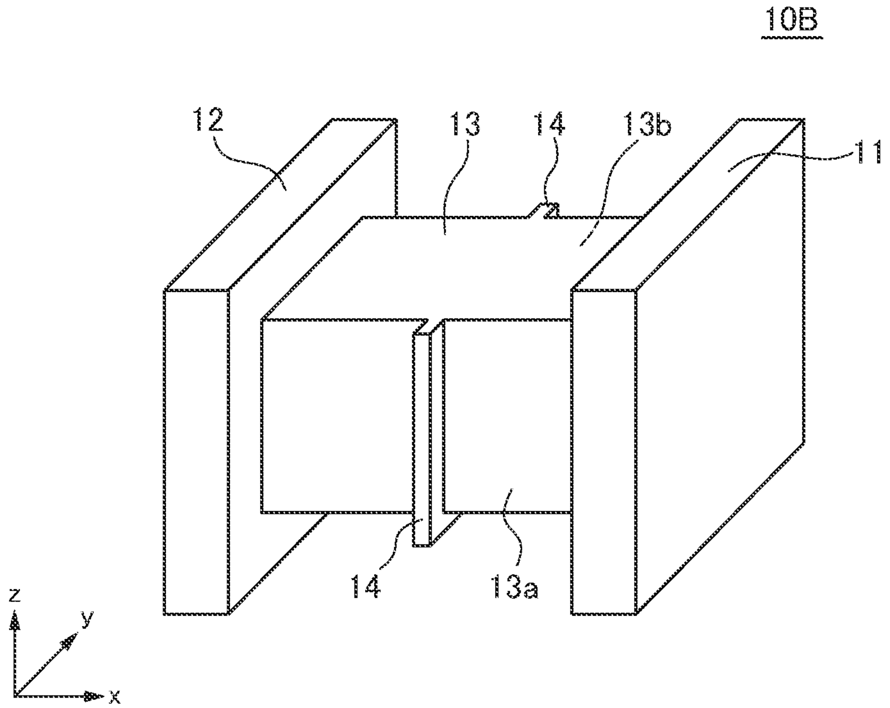
FIG. 13 is a schematic perspective view illustrating the a drum-shaped first magnetic core according to a second modification.
Figure 14:
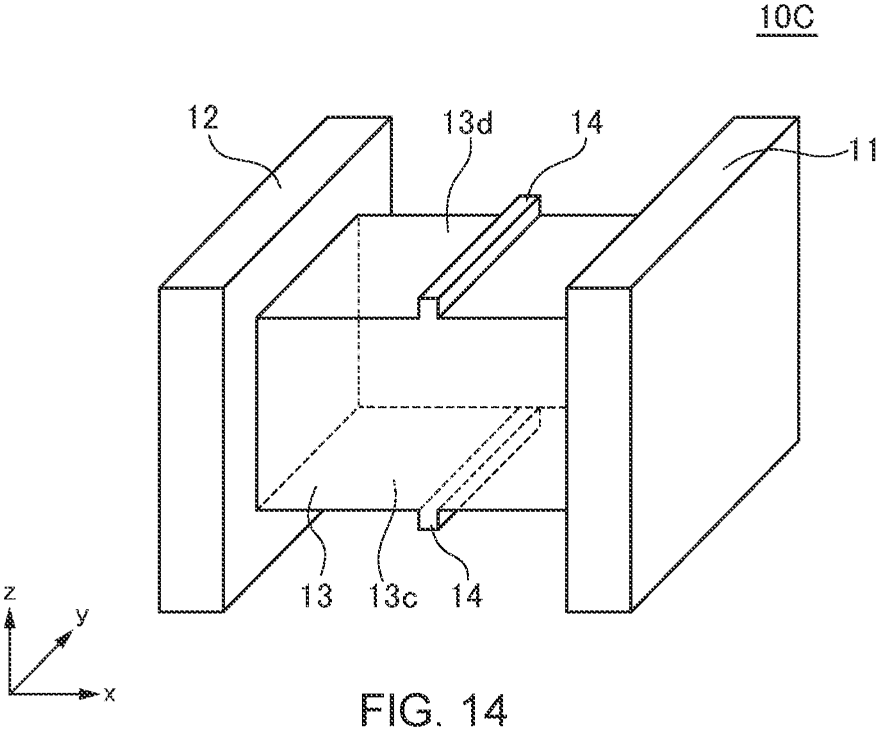
FIG. 14 is a schematic perspective view illustrating the a drum-shaped first magnetic core according to a third modification.

Although the protrusion part 14 is provided over the entire periphery of the winding core part 13 in the example illustrated in FIG. 4, it may be provided on only an upper surface 13*d* of the winding core part 13 like a magnetic core 10A according to a first modification illustrated in FIG. 12, it may be provided on two side surfaces 13*a* and 13*b* of the winding core part 13 like a magnetic core 10B according to a second modification illustrated in FIG. 13, or it may be provided on upper and lower surfaces 13*d* and 13*c* of the winding core part 13 like a magnetic core 10C according to a third modification illustrated in FIG. 14. As described above, it is possible to adjust the impedance with respect to the differential mode component also by changing the number or position of the protrusion parts 14.

Figure 15:
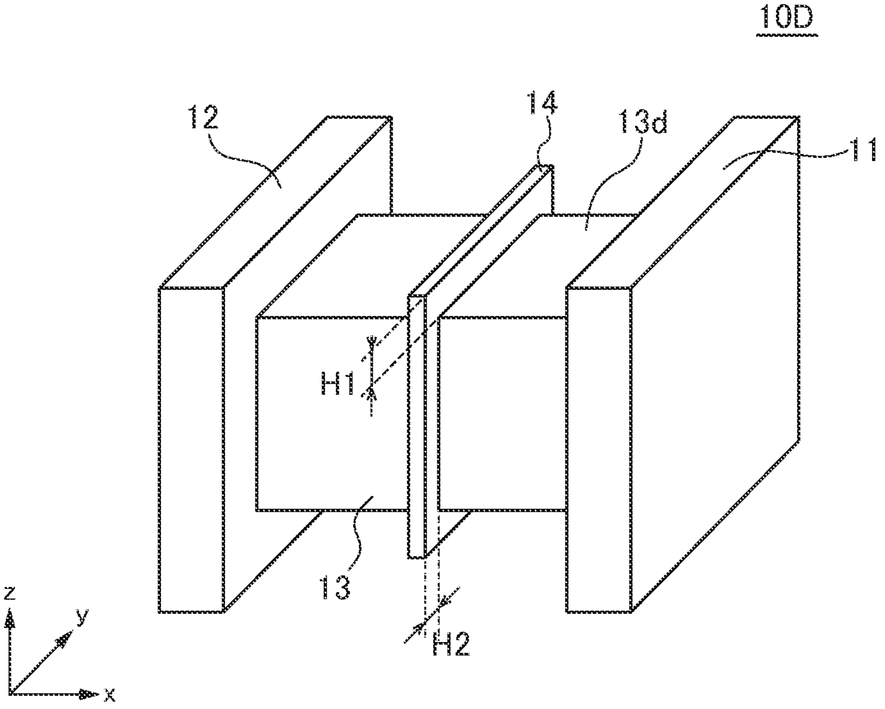
FIG. 15 is a schematic perspective view illustrating the a drum-shaped first magnetic core according to a fourth modification.

Further, like a magnetic core 10D according to a fourth modification illustrated in FIG. 15, a height dimension H1 of the protrusion part 14 protruding from the upper surface 13*d* of the winding core part 13 may be made larger than a height dimension H2 of the protrusion part 14 protruding from the other surfaces. That is, the height of the protrusion part 14 need not be constant.

Figure 16:
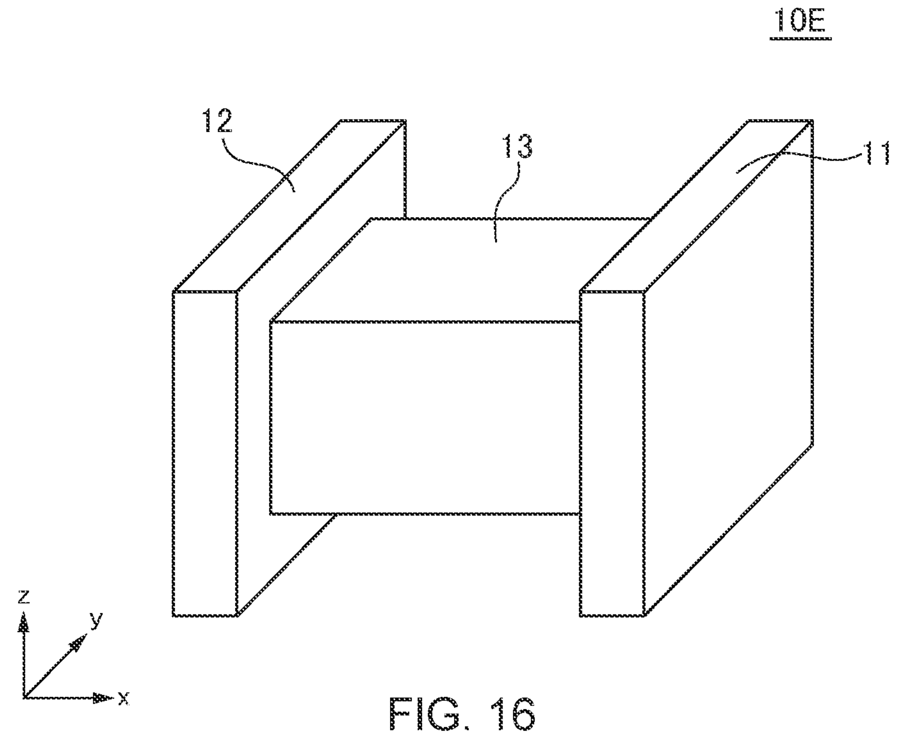
FIG. 16 is a schematic perspective view illustrating the a drum-shaped first magnetic core according to a fifth modification.

Further, like a magnetic core 10E according to a fifth modification illustrated in FIG. 16, the winding core part 13 may have flat surfaces, that is, the winding core part 13 may not have the protrusion part 14. With this configuration, the magnetic flux ϕ3 becomes very small, so that there can be provided a coil component having low impedance with respect to the differential mode component. The winding core part 13 without the protrusion part 14 is suitable for when the wires W1 and W2 are bifilar-wound or wound in an overlapping manner.

Figure 17:
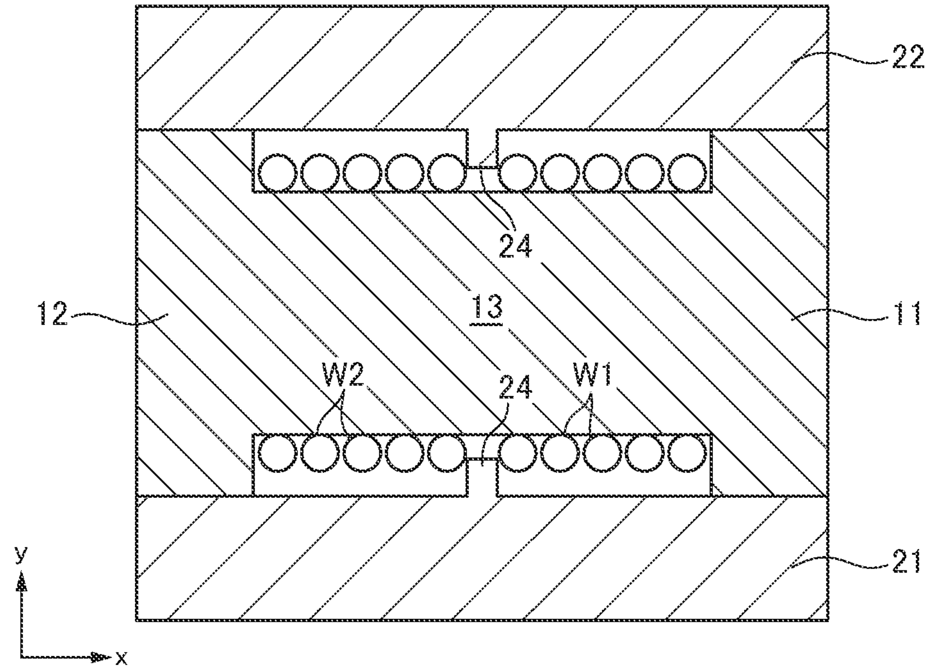
FIG. 17 is a schematic xy cross section of an example in which a protrusion part is provided in a second magnetic core.

On the other hand, like the example illustrated in FIG. 17, a protrusion part 24 is provided in the second magnetic core 20 (or third magnetic core 30) to bring the winding core part 13 and the second magnetic core 20 (or third magnetic core 30) close to each other at this portion. As a result, a path in which the magnetic flux ϕ3 flows is formed, so that even when the above magnetic core 10E is used, it is possible to obtain impedance with respect to the differential mode component.

As described above, in the coil component 1 according to the present embodiment, the first magnetic core 10 is covered from four directions by the C-type second magnetic core 20 and plate-like third magnetic core 30, so that a closed magnetic path small in magnetic resistance is formed. As a result, it is possible to obtain high impedance with respect to the common mode component. In addition, it is not necessary to form an opening for passing the wires W1 and W2 therethrough in the first magnetic core 10, thus making it possible to prevent increase in magnetic resistance due to the formation of the opening in the first magnetic core 10. On the other hand, the cuts 41 to 44 are formed in the second magnetic core 20; however, the cuts 41 to 44 are each widened in the flow direction of magnetic flux and are arranged in the magnetic flux flow direction. Thus, the division of magnetic flux is minimized, whereby reduction in inductance due to the formation of the cuts 41 to 44 can be minimized.

Further, in the coil component 1, the wires W1 and W2 are not exposed, but covered with the second magnetic core 20 and third magnetic core 30, thus making it possible to enhance product reliability. Further, the magnetic cores 10, 20, and 30 have simple shapes, preventing a manufacturing process from being complicated.

Although the third magnetic core 30 is used as the plate-like member in the present embodiment, a non-magnetic material such as resin may be used as the material of the plate-like member. In this case, inductance is reduced, and leakage magnetic flux is increased, as compared to when the third magnetic core 30 is used as the plate-like member. However, when the non-magnetic material is used, the thickness of the plate-like member can be made smaller, which allows the plate-like member to be adsorbed using a picking tool in a mounting process and allows a further reduction in the height of the coil component. Further, when a composite material obtained by mixing magnetic particles in resin is used as the plate-like member, it is possible to suppress reduction in inductance and leakage magnetic flux while reducing the height of the coil component 1.

Figure 18:
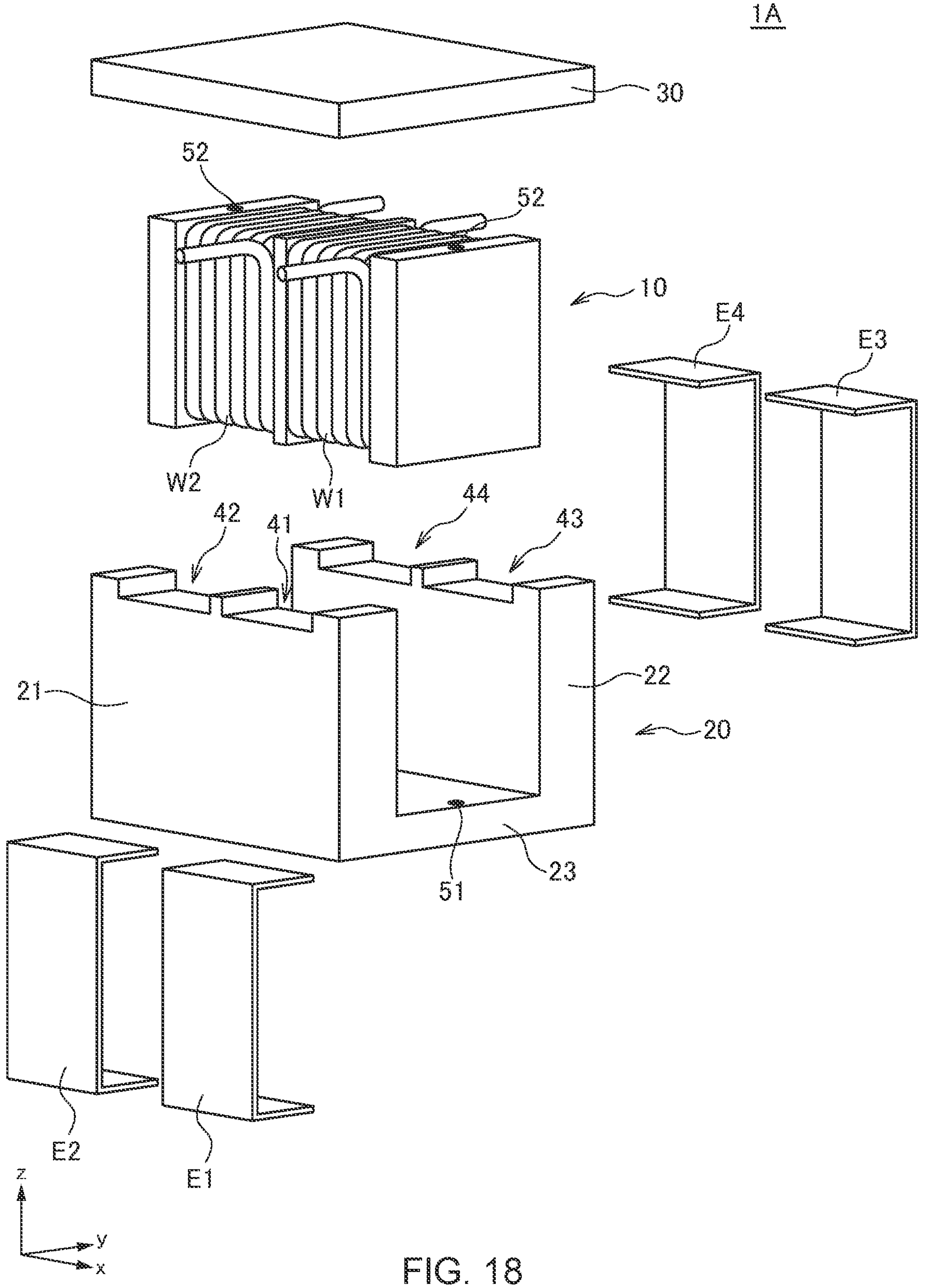
FIG. 18 is a schematic exploded perspective view for explaining the structure of a coil component according to a modification.

FIG. 18 is a schematic exploded perspective view for explaining the structure of a coil component 1A according to a modification.

Figure 19A:
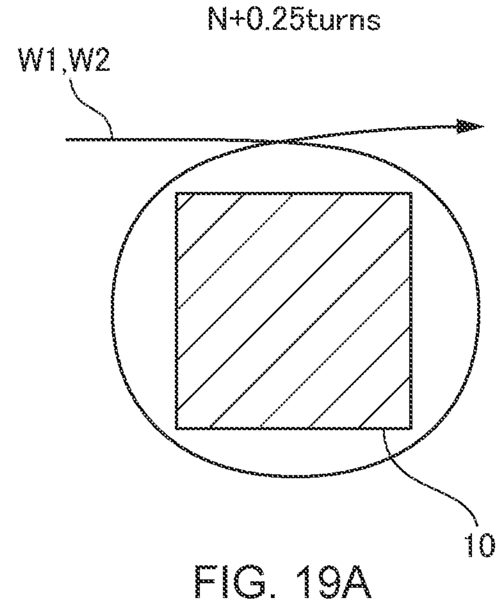
FIG. 19A is a schematic diagram indicating a winding pattern of wires according to the coil component according to the first embodiment of the present invention.
Figure 19B:
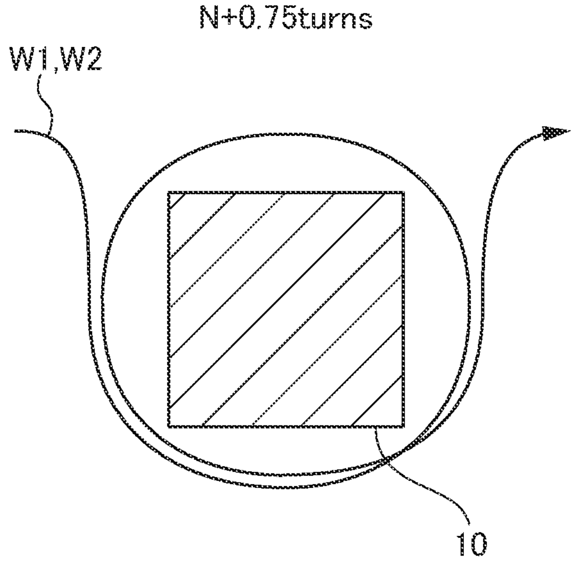
FIG. 19B is a schematic diagram indicating a winding pattern of wires according to the coil component according to the modification.

The coil component 1A illustrated in FIG. 18 differs from the coil component 1 according to the above embodiment in the winding direction of the wires W1 and w2 wound around the magnetic core 10. That is, in the coil component 1 according to the above embodiment, the wires W1 and W2 are wound in the clockwise direction from the one ends W1*a*, W2*a* to the other ends W1*b*, W2*b*, respectively, while in the coil component 1A illustrated in FIG. 18, the wires W1 and W2 are wound in the counterclockwise direction from the one ends W1*a*, W2*a* to the other ends W1*b*, W2*b*, respectively. As a result, in the coil component 1 according to the above embodiment, the number of turns of each of the wires W1 and W2 is N+0.25 turns (N is an integer number) as illustrated in FIG. 19A, while in the coil component 1A illustrated in FIG. 18, the number of turns of each of the wires W1 and W2 is N+0.75 turns (N is an integer number) as illustrated in FIG. 19B. As a result, the number of turns is increased by 0.5 turns as compared to the coil component 1 according to the above embodiment, making it possible to obtain higher inductance.

Second Embodiment

Figure 20:
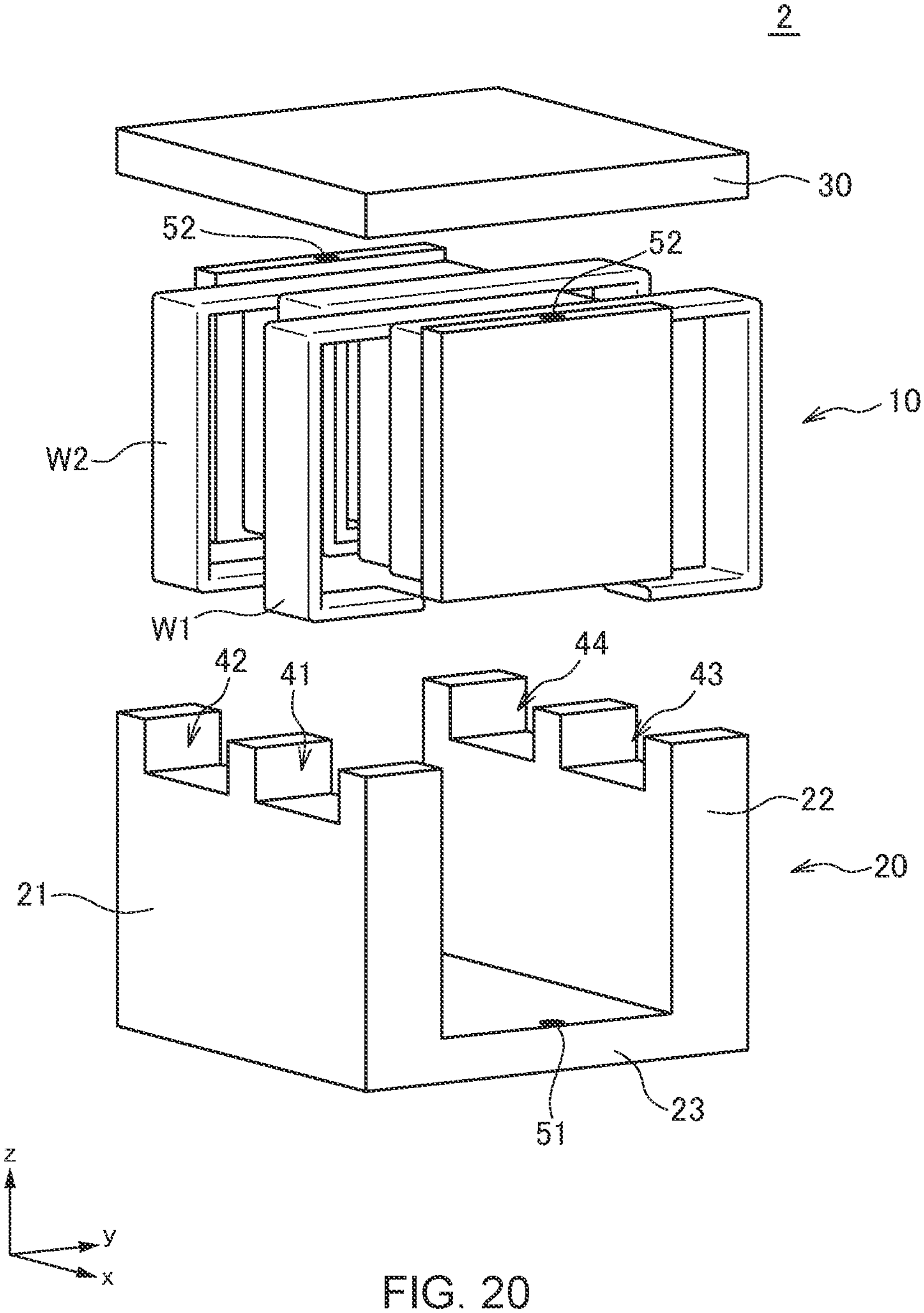
FIG. 20 is a schematic exploded perspective view for explaining the structure of a coil component according to a second embodiment of the present invention.

FIG. 20 is a schematic exploded perspective view for explaining the structure of a coil component 2 according to the second embodiment of the present invention.

As illustrated in FIG. 20, the coil component 2 according to the second embodiment differs from the coil component 1 according to the first embodiment in that flat-type wires W1 and W2 each having a flat shape in cross section are used, and that the terminal electrodes E1 to E4 are omitted. Other configurations are the same as those of the coil component 1 according to the first embodiment, so the same reference numerals are given to the same elements, and overlapping description will be omitted.

In the present embodiment, the end portions of the flat-type wires W1 and W2 are bent, and the bent portions are used as the terminal electrodes as they are. That is, one ends of the wires W1 and W2 extend in the z-direction along the first wall surface part 21 of the second magnetic core 20 and then bent in the y-direction along the third wall surface part 23 of the second magnetic core 20. Similarly, the other ends of the wires W1 and W2 extend in the z-direction along the second wall surface part 22 of the second magnetic core 20 and then bent in the y-direction along the third wall surface part 23 of the second magnetic core 20. As a result, four terminal electrodes E1 to E4 constituted by the one ends and the other ends of the wires W1 and W2 are formed on the surface of the third wall surface part 23 of the second magnetic core 20, making it possible to mount the coil component 2 on the mounting substrate 8 illustrated in FIG. 7 without separately forming the terminal electrodes E1 to E4 using terminal fittings or the like.

Figure 21:
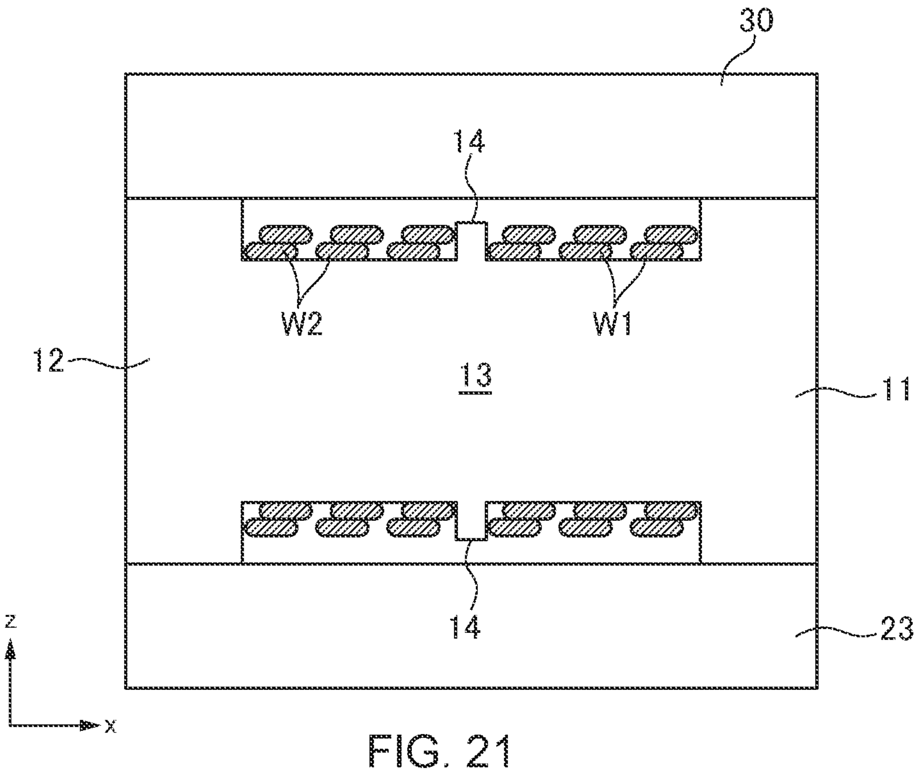
FIG. 21 is a schematic xz cross section of the coil component according to the second embodiment of the present invention.
Figure 22:
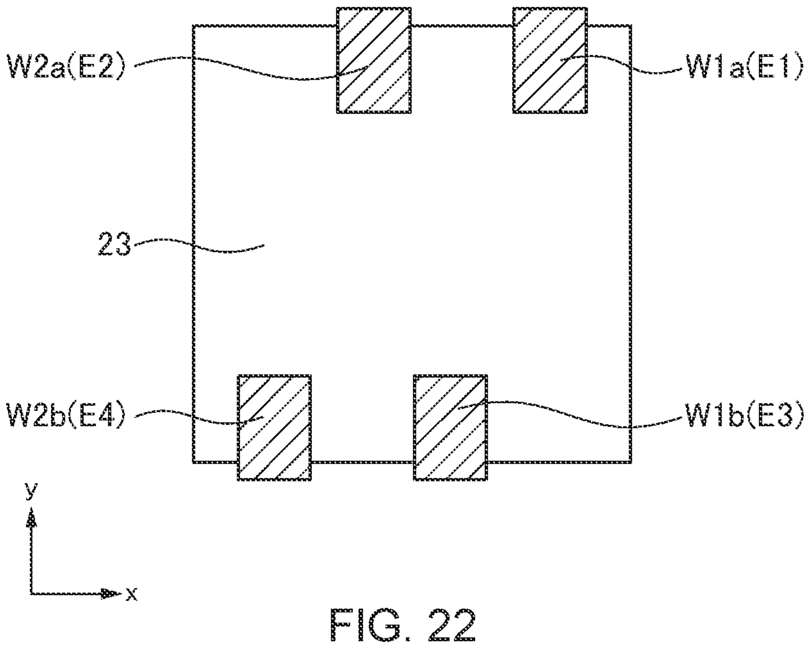
FIG. 22 is a bottom view indicating a first layout of terminal electrodes.
Figure 23:
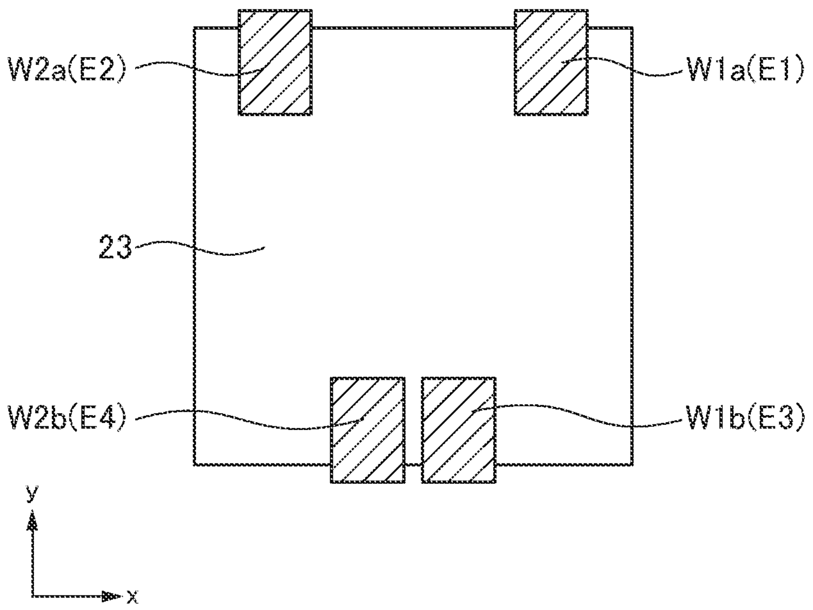
FIG. 23 is a bottom view indicating a second layout of terminal electrodes.

Further, as illustrated in FIG. 21 which is an xy cross-sectional view of the coil component 2, the wires W1 and W2 may each be wound in multiple turns around the winding core part 13. The positions of the end portions (terminal electrodes E1 to E4) of the wires W1 and W2 serving as the terminal electrodes are changed depending on the winding pattern of the wires W1 and W2. For example, when the wires W1 and W2 are each wound in a single layer around the winding core part 13 in the winding pattern illustrated in FIG. 5, the layout illustrated in FIG. 22 which is a bottom view is obtained. When the wires W1 and W2 are each wound in a single layer around the winding core part 13 in the winding pattern illustrated in FIG. 6, the layout illustrated in FIG. 23 which is a bottom view is obtained. In the above cases, directionality occurs in appearance; however, effectively no directionality occurs when the shape of a land pattern on the mounting substrate 8 is optimized (e.g., the size thereof is enlarged).

Figure 24:
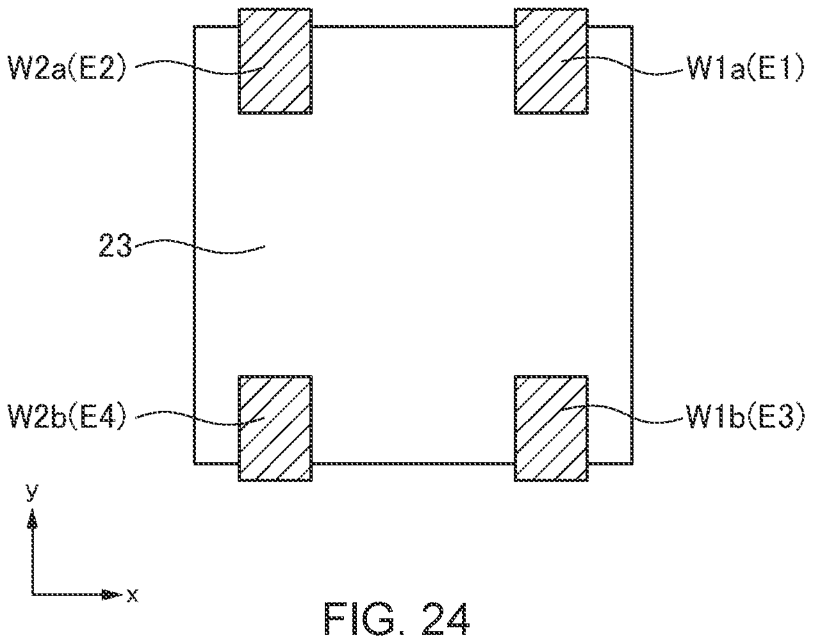
FIG. 24 is a bottom view indicating a third layout of terminal electrodes.

Further, when the wires W1 and W2 are each wound around the winding core part 13 in two layers as illustrated in FIG. 21, the end portions (terminal electrodes E1 to E4) of the wires W1 and W2 can be laid out as illustrated in FIG. 24. In this case, directionality can be eliminated even in appearance.

Third Embodiment

Figure 25:
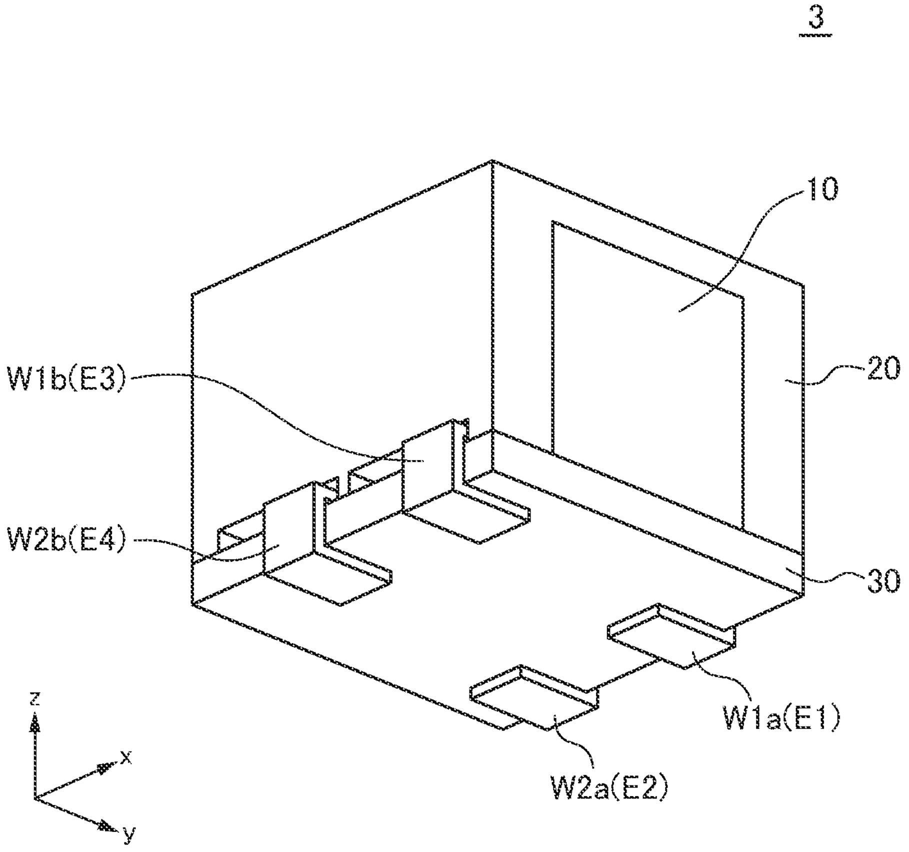
FIG. 25 is a schematic perspective view illustrating the outer appearance of a coil component according to a third embodiment of the present invention.

FIG. 25 is a schematic perspective view illustrating the outer appearance of a coil component 3 according to the third embodiment of the present invention.

As illustrated in FIG. 25, the coil component 3 according to the third embodiment differs from the coil component 2 according to the second embodiment in that the end portions of the flat-type wires W1 and W2 are bent to the third magnetic core 30 side. Other configurations are the same as those of the coil component 2 according to the second embodiment, so the same reference numerals are given to the same elements, and overlapping description will be omitted.

The terminal electrodes E1 to E4, which are end portions of the wires W1 and W2 are provided on the third magnetic core 30 side, and so the coil component 3 according to the present embodiment is mounted on the mounting substrate 8 in a vertically opposite direction (180 degrees) to the coil components 1 and 2 according to the first and second embodiments. As exemplified in the present embodiment, the vertical direction of the coil component according to the present invention is not particularly limited.

Fourth Embodiment

Figure 26:
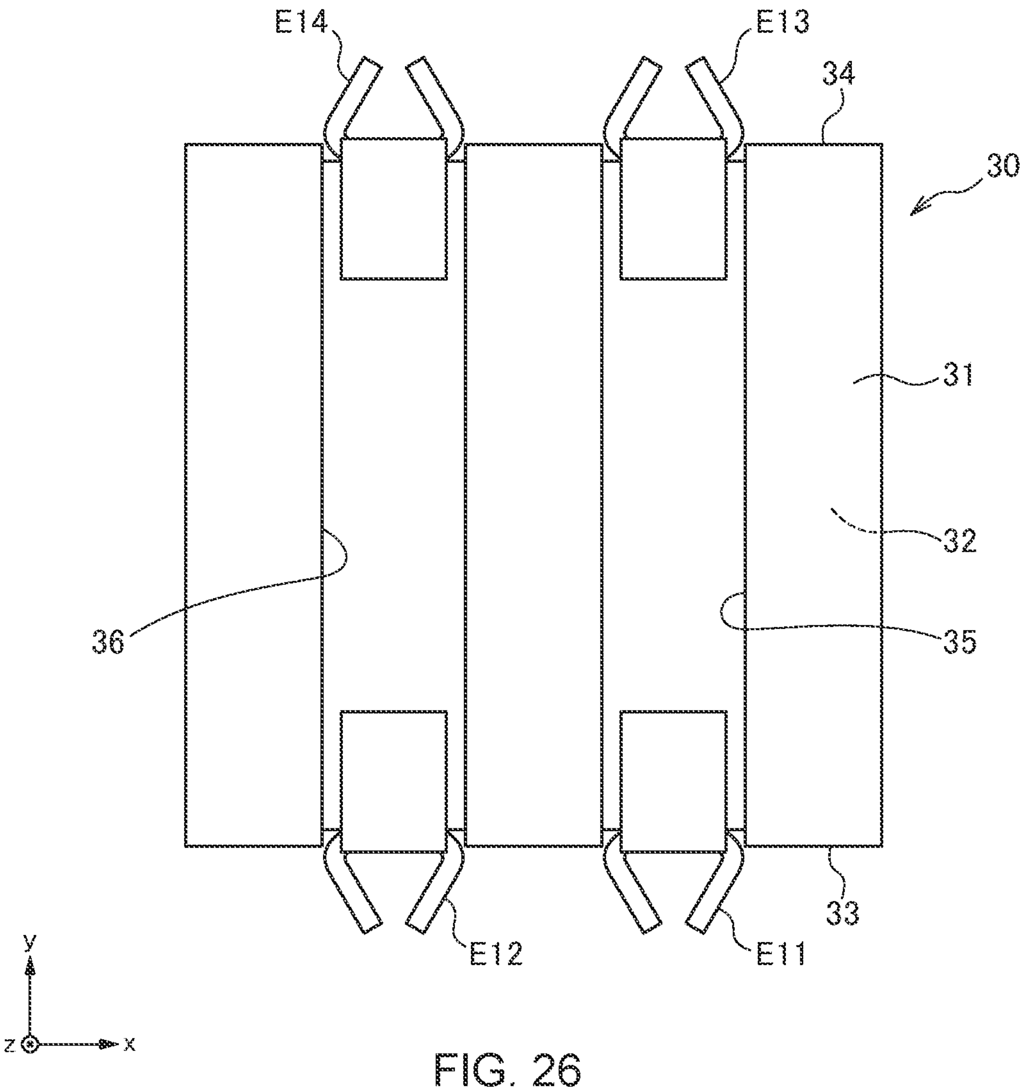
FIG. 26 is a schematic plan view for explaining a positional relationship between a third magnetic core used in a coil component according to a fourth embodiment of the present invention and terminal fittings.

Although the terminal electrodes E1 to E4 are provided on the second magnetic core 20 in the first embodiment, the terminal electrodes or terminal fittings may be provided on the third magnetic core 30. In this case, as illustrated in FIG. 26, two groove parts 35 and 36 may be formed in the third magnetic core 30, and terminal fittings E11 to E14 may be fixed to the groove parts 35 and 36. The groove parts 35 and 36 may be formed over the lower surface 31, upper surface 32, and side surfaces 33 and 34 of the third magnetic core 30. The lower surface 31 is a surface to be bonded to the first magnetic core 10. The terminal fitting E11 is fixed to a part of the groove part 35 that corresponds to the side surface 33, the terminal fitting E13 is fixed to a part of the groove part 35 that corresponds to the side surface 34, the terminal fitting E12 is fixed to a part of the groove part 36 that corresponds to the side surface 33, and the terminal fitting E14 is fixed to a part of the groove part 36 that corresponds to the side surface 34. As described above, the terminal fittings E11 and E12 are arranged in the x-direction along the side surface 33, and the terminal fittings E13 and E14 are arranged in the x-direction along the side surface 34. Each of the groove parts 35 and 36 may be set to a depth nearly equal to the thickness of each of the terminal fittings E11 to E14. Although the groove parts 35 and 36 may not necessarily be formed in the third magnetic core 30, the protruding amount of each of the terminal fittings E11 to E14 can be reduced by forming the groove parts 35 and 36. Further, the groove parts 35 and function also as positioning parts for the terminal fittings E11 to E14.

Figure 27:
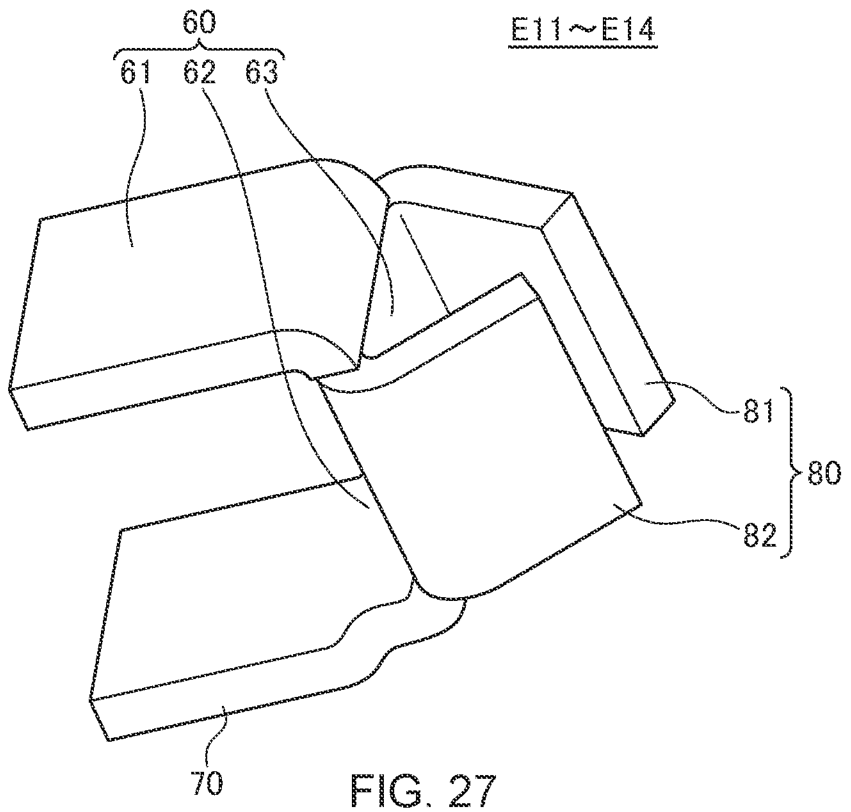
FIG. 27 is a schematic perspective view for explaining the shape of each of the terminal fittings.

FIG. 27 is a schematic perspective view for explaining the shape of each of the terminal fittings E11 to E14.

As illustrated in FIG. 27, the terminal fittings E11 to E14 each have a fixing part 60 constituted of flat plate parts 61 to 63, a plate spring part 70 connected to the fixing part 60, and a wire connection part 80 constituted of tabs 81 and 82 and can be produced by punching a metal plate of copper (Cu) or the like, followed by bending. The flat plate parts 61, 62 and plate spring part 70 each have a main surface which is the xy plane, and the flat plate part 63 has a main surface which is the xz plane.

The flat plate parts 61 and 62 constituting the fixing part 60 extend parallel to each other, and the interval between the flat plate parts 61 and 62 is nearly equal to the thickness of a part of the third magnetic core 30 where the groove part 35 or 36 is formed. The flat plate part 63 connects the flat plate parts 61 and 62 and extends perpendicular thereto. The plate spring part 70 is connected to the flat plate part 62 of the fixing part 60 and extends parallel to the flat plate part 61. The interval between the plate spring part 70 and the flat plate part 61 is larger than the thickness of a part of the third magnetic core 30 where the groove part 35 or 36 is formed.

Figure 28:
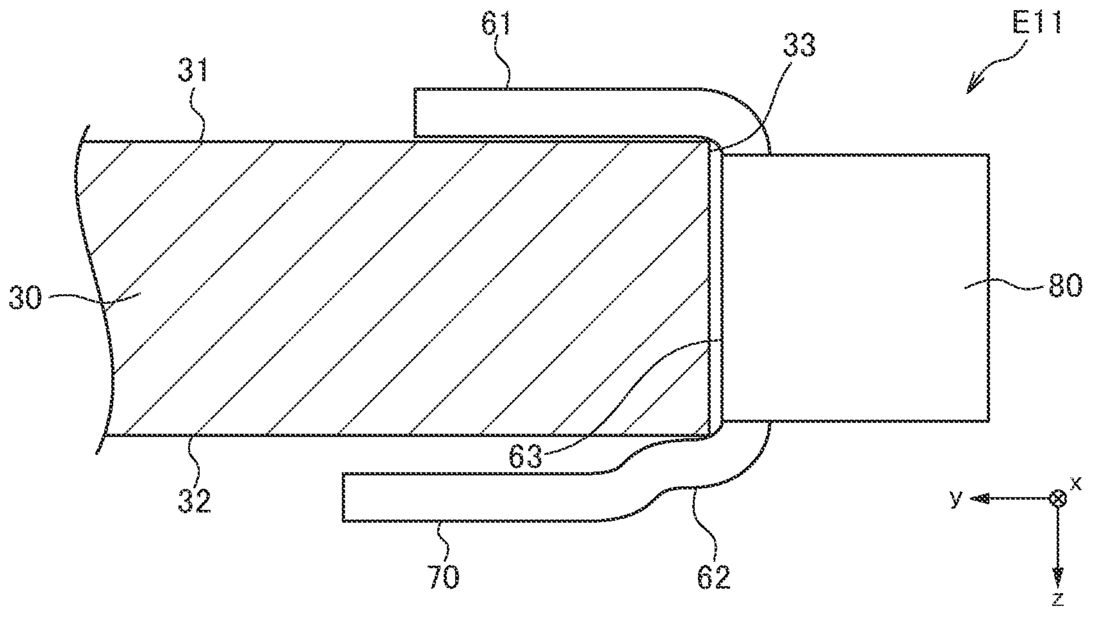
FIG. 28 is a partial yz cross-sectional view illustrating a state where the terminal fitting is fitted to the third magnetic core.

Thus, when, for example, the terminal fitting E11 is fitted to the third magnetic core 30, the flat plate parts 61 and 62 contact the lower surface 31 and upper surface of the third magnetic core 30, respectively, as illustrated in FIG. 28 which is a partial yz cross-sectional view, with the result that the terminal fitting E11 is fitted to the third magnetic core 30 so as to sandwich the third magnetic core 30. To fix the terminal fitting E11 and third magnetic core 30 more firmly, an adhesive may be interposed between the terminal fitting E11 and the third magnetic core 30. In this case, it is preferable to bond the flat plate part 61 and the lower surface 31 of the third magnetic core 30 by an adhesive and, at the same time, to bond the flat plate part 63 and the side surface 33 of the third magnetic core 30 by an adhesive. Thus, the adhesive is provided at a portion where the opposing area is large, so that sufficient bonding strength can be ensured. Although only the terminal fitting E11 is illustrated, the same can be said for the other terminal fittings E12 to E14.

Further, as illustrated in FIG. 28, the plate spring part 70 is retained by the flat plate part 62 in a state of not contacting the third magnetic core 30 and being separated by a predetermined distance from the upper surface 32 of the third magnetic core 30 in the z-direction. The plate spring part 70 is connected to the land pattern of the power supply line formed on the mounting substrate 8 illustrated in FIG. 7 through a solder. As described above, in the present embodiment, the plate spring part 70 is connected to the land pattern and, thereby, a spring property is imparted to the mechanical connection between the mounting substrate 8 and the coil component, so that even when deformation such as warpage occurs in the mounting substrate 8, stress due to the deformation is not directly transmitted to the third magnetic core 30, but transmitted thereto through the terminal fittings E11 to E14 each having elasticity, thus significantly reducing the stress to be applied to the third magnetic core 30.

The tabs 81 and 82 constituting the wire connection part 80 can be bent inward. Before the tabs 81 and 82 are completely bent inward, the end portion of the wire (W1, W2) is disposed in an area surrounded by the flat plate part 63 and tabs 81, 82 and, in this state, the tabs 81 and 82 are bent inward, whereby the end portion of the wire (W1, W2) can be fixed to the terminal fitting (E11 to E14) so as to be held between the flat plate part 63 and the tabs 81, 82. The end portion of the wire (W1, W2) may be held between the flat plate part 63 and the tabs 81, 82 before being welded to the tabs 81 and 82.

As described above, in the coil component according to the fourth embodiment, although the third magnetic core 30 made of ferrite or the like constitutes the mounting surface, the terminal fittings E11 to E14 fixed to the third magnetic core 30 each have elasticity, so that even when a material which gets easily broken is used as the material of the third magnetic core 30, it is possible to prevent damage to the third magnetic core 30 caused by deformation of the mounting substrate 8.

It is apparent that the present invention is not limited to the above embodiments, but may be modified and changed without departing from the scope and spirit of the invention.

What is claimed is:

1. A coil component comprising:

a first magnetic core having a winding core part whose axis direction is a first direction, a first flange part provided at one end of the winding core part in the first direction, and a second flange part provided at other end of the winding core part in the first direction;

a second magnetic core having a first wall surface part covering the first magnetic core from one side in a second direction perpendicular to the first direction, a second wall surface part covering the first magnetic core from other side in the second direction, and a third wall surface part covering the first magnetic core from one side in a third direction perpendicular to the first and second directions; and first and second flat-type wires in which a size in a thickness direction is smaller than a size in a width direction, wherein the first flat-type wire includes a first end portion, a third end portion, and a first winding section located between the first and third end portions and wound around the winding core part of the first magnetic core such that the thickness direction is directed perpendicular to the first direction and such that that the width direction is directed along the first direction, wherein the second flat-type wire includes a second end portion, a fourth end portion, and a second winding section located between the second and fourth end portions and wound around the winding core part of the first magnetic core such that the thickness direction is directed perpendicular to the first direction and that the width direction is directed along the first direction, and wherein the first, second, third, and fourth end portions constitute first, second, third, and fourth terminal electrodes, respectively, wherein the first and second end portions are bent so as to cover an outer surface of the first and third wall surface parts of the second magnetic core, wherein the third and fourth end portions are bent so as to cover an outer surface of the second and third wall surface parts of the second magnetic core, wherein the first and second end portions are arranged in the first direction, and wherein the third and fourth end portions are arranged in the first direction, wherein center positions of the first, second, third, and fourth end portions different in the first direction from one another, and wherein the center position of the third and fourth end portions in the first direction is located between the center position of the first end portion in the first direction and the center position of the second end portion in the first direction.

2. The coil component as claimed in claim 1, wherein the first and third end portions are arranged in the second direction, and wherein the second and fourth end portions are arranged in the second direction.

3. The coil component as claimed in claim 1, wherein the first wall surface part of the second magnetic core has first and second cut parts, wherein the second wall surface part of the second magnetic core has third and fourth cut parts, wherein a part of the first end portion is disposed in the first cut part, wherein a part of the second end portion is disposed in the second cut part, wherein a part of the third end portion is disposed in the third cut part, and wherein a part of the fourth end portion is disposed in the fourth cut part.

4. The coil component as claimed in claim 1, further comprising a plate-like member covering the first magnetic core from other side in the third direction.

5. The coil component as claimed in claim 1, wherein each of the first and second flat-type wires has an inner flat surface facing the winding core part of the first magnetic core and an outer flat surface opposite to the inner flat surface.

6. The coil component as claimed in claim 5, wherein the outer flat surface of a first turn of the first winding section of the first flat-type wire is in contact with the inner flat surface of a second turn of the first winding section of the first flat-type wire, and wherein the outer flat surface of a third turn of the second winding section of the second flat-type wire is in contact with the inner flat surface of a fourth turn of the second winding section of the second flat-type wire.

7. The coil component as claimed in claim 1, wherein the center position of the third end portion in the first direction is located between the center position of the first end portion in the first direction and the center position of the second end portion in the first direction, and wherein the center position of the second end portion in the first direction is located between the center position of the third end portion in the first direction and the center position of the fourth end portion in the first direction.

8. The coil component as claimed in claim 6, wherein a sum of sizes of the first and second turns in the thickness direction is smaller than a size of each of the first and second turns in the width direction, and wherein a sum of sizes of the third and fourth turns in the thickness direction is smaller than a size of each of the third and fourth turns in the width direction.

9. The coil component as claimed in claim 6, wherein a center position of the first turn in the first direction is different from a center position of the second turn in the first direction, and wherein a center position of the third turn in the first direction is different from a center position of the fourth turn in the first direction.

* * * * *